(12) United States Patent
Li et al.

(10) Patent No.: US 9,568,323 B2
(45) Date of Patent: Feb. 14, 2017

(54) LOCATION DETERMINATION

(75) Inventors: Fan Li, Beijing (CN); Guo Bin Shen, Beijing (CN)

(73) Assignee: Microsoft Technology Licensing, LLC, Redmond, WA (US)

(\*) Notice: Subject to any disclaimer, the term of this patent is extended or adjusted under 35 U.S.C. 154(b) by 320 days.

(21) Appl. No.: 13/274,916

(22) Filed: Oct. 17, 2011

(65) Prior Publication Data

US 2013/0095861 A1 Apr. 18, 2013

(51) Int. Cl.
| H04W 24/00 | (2009.01) |
| G01C 21/32 | (2006.01) |
| G01S 5/02 | (2010.01) |
| H04W 4/02 | (2009.01) |
| H04W 64/00 | (2009.01) |

(52) U.S. Cl.
CPC ............ *G01C 21/32* (2013.01); *G01S 5/0263* (2013.01); *H04W 4/028* (2013.01); *H04W 4/027* (2013.01); *H04W 64/00* (2013.01)

(58) Field of Classification Search
CPC .... H04W 64/00; H04W 64/003; H04W 64/06; H04W 4/026; H04W 4/027; H04W 64/006; H04W 4/04; H04W 4/027; H04W 4/028; G01C 21/20; G01C 21/26; G01C 21/28; G01C 21/30; G01C 21/32; G01S 5/0263; G01S 5/0278; G01S 5/0294
USPC .......................... 455/404.2, 414.2, 457, 456.6
See application file for complete search history.

(56) References Cited

U.S. PATENT DOCUMENTS

| 6,308,134 | B1* | 10/2001 | Croyle et al. ............... 701/472 |
| 6,618,683 | B1 | 9/2003 | Berstis et al. |
| 7,224,956 | B1* | 5/2007 | O'Neil ........................ 455/404.1 |
| 7,907,838 | B2 | 3/2011 | Nasiri et al. |
| 8,209,121 | B1* | 6/2012 | Ogale ............................ 701/495 |
| 2004/0204840 | A1* | 10/2004 | Hashima .............. G01C 21/265 701/526 |
| 2007/0260418 | A1* | 11/2007 | Ladetto et al. ............... 702/150 |
| 2008/0125142 | A1* | 5/2008 | Chang-Hung ............. 455/456.6 |
| 2009/0005975 | A1* | 1/2009 | Forstall .................. G01C 21/20 701/533 |
| 2009/0093259 | A1* | 4/2009 | Edge et al. ................. 455/456.3 |
| 2009/0201149 | A1 | 8/2009 | Kaji |
| 2009/0278734 | A1* | 11/2009 | Haataja et al. .......... 342/357.01 |
| 2010/0077020 | A1* | 3/2010 | Paloheimo et al. .......... 709/203 |
| 2010/0130229 | A1 | 5/2010 | Sridhara et al. |
| 2010/0134288 | A1 | 6/2010 | Huang et al. |

(Continued)

OTHER PUBLICATIONS

Constandache et al., "Energy-efficient Localization Via Personal Mobility Profiling," Published Oct. 2009, retrieved at <<http://synrg.ee.duke.edu/papers/mobicase09.pdf>>, 20 pages.

(Continued)

*Primary Examiner* — Thai Vu
(74) *Attorney, Agent, or Firm* — Liwen Shi; Chris L. Weider; Micky Minhas

(57) ABSTRACT

Techniques for determining a location of a device include estimating a mobility trace of the device, mapping the mobility trace to a map, and determining the location of the device based on the mapped mobility trace. The mobility trace may be estimated based on a reading obtained from the device, which may be a reading from an accelerometer and/or magnetometer sensor. The determined location of the device may correspond to a location on the mapped mobility trace.

20 Claims, 10 Drawing Sheets

(56) References Cited

U.S. PATENT DOCUMENTS

| | | |
|---|---|---|
| 2011/0141006 A1 | 6/2011 | Rabu |
| 2011/0201972 A1* | 8/2011 | Ten Kate ..................... 600/595 |
| 2012/0203453 A1* | 8/2012 | Lundquist et al. ........... 701/434 |

OTHER PUBLICATIONS

Dyor, Matthew "Location-Based Notification" U.S. Appl. No. 12/725,402, filed Mar. 16, 2010, 40 pages.

Dyor, Matthew "Managed Dissemination of Location Data" U.S. Appl. No. 12/958,325, filed Dec. 1, 2010, 42 pages.

Hache, et al. Mobility Change-of-State Detection Using a Smarphone-base Approach, Medical Measurements and Applications Proceedings (MeMeA), 2010 IEEE International Workshop, Pub 2010, 4 pages.

Hoseinitabatabaei, et al., "uDirect: A Novel Approach for Pervasive Observation of User Direction with Mobile Phones," retrieved at <<http://www.percom.org/proceedings/main/papers/p74-hoseinitabatabaei.pdf>>, 2011 IEEE International Conference on Pervasive Computing and Communications (PerCom), Seattle, Mar. 21-25, 2011, 10 pages.

Lin, et al., "Enabling Energy-Efficient and Quality Localization Services," Proceedings of the Fourth Annual IEEE International Conference on Pervasive Computing and Communications Workships, Mar. 13-17, 2006, retrieved at <<http://www.eecs.harvard.edu/~thlin/gols-percom06.pdf>>, 4 pages.

Shafer et al., "Movement Detection for Power-Efficient Smartphone WLAN Localization," Published Oct. 17-21, 2010, MSWiM '10, Bodrum, Turkey, retrieved at <<http://fsweb.olin.edu/~mchang/publications/mswim27f-shafer.pdf>>, 10 pages.

Wang, et al., "A Framework of Energy Efficient Mobile Sensing for Automatic User State Recognition," Published Date: Jun. 22-25, 2009, MobiSys'09, Krakow, Poland, , retrieved at <<http://www.usc.edu/dept/ee/scip/assets/002/63910.pdf>>, 14 pages.

You et al., "Impact of Sensor-Enhanced Mobility Prediction on the Design of Energy-Efficient Localization," Published Nov. 2008, retrieved at <<http://mll.csie.ntu.edu.tw/papers/ad_hoc_journal_final.pdf>>, 19 pages.

Zheng, et al. "Mining Correlation Between Locations Using Location History" U.S. Appl. No. 12/711,130, filed Feb. 23, 2010, 47 pages.

Zheng, et al. "Route Computation Based on Route-Oriented Vehicle Trajectories" U.S. Appl. No. 12/712,053, filed Feb. 24, 2010, 49 pages.

Ashbrook, et al., Using GPS to learn significant locations and predict movement across multiple users, Pers Ubiquit Comput 2003, 7: pp. 275-286.

CeSetUserNotificationEx, retrieved on Jun. 29, 2011 at <<http://msdn.microsoft.com/en-us/library/ms908105.aspx>>, 1 page.

Constandache, et al., EnLoc: Energy-Efficient Localization for Mobile Phones, In IEEE INFOCOM Mini Conference, 2009, 5 pages.

Dey, et al., CybreMinder: A Context-Aware System for Supporting Reminder, HUC 2000, pp. 172-186.

Gaonkar, et al., Micro-Blog: Map-casting from Mobile Phones to Virtual Sensor Maps, SenSys 2007, 2 pages.

Google Latitude, retrieved on Jun. 29, 2011 from <<http://www.google.com/intl/en_us/latitude/intro.html>>, 1 page.

Griswold, et al., ActiveCampus: Experiments in Community-Oriented Ubiquitous Computing, Published by the IEEE Computer Society, Oct. 2004, pp. 73-81.

Gyorbiro, et al., An Activity Recognition System for Mobile Phones, Mobile Netw Appl (2009) 14: 82-91.

He, et al., Activity Recognition from Acceleration Data Using AR Model Representation and SVM, Proceedings of the Seventh International Conference on Machine Learning and Cybernetics 2008, pp. 2245-2250.

Hightower, et al., Location Systems for Ubiquitous Computing, IEEE Computing, Aug. 2001, pp. 57-66.

Johnson, Windows Mobile Power Management, retrieved on Jun. 28, 2011 from <<http://www.rdacorp.com/PDF/Windows Mobile Power Management.pdf>>, 19 pages.

JOYity—The Most Exciting Location-Based Gaming Platform, retrieved on Jun. 29, 2011 from <<http://www.joyity.com>>, 1 page.

Kim, et al., Detecting Energy-Greedy Anomalies and Mobile Malware Variants, MobiSys 2008, pp. 239-252.

Kim, et al., Extracting a Mobility Model from Real User Traces, In INFOCOM 2006, pp. 1-13.

Krumm, et al., The NearMe Wireless Proximity Server, UbiComp 2004, pp. 283-300.

Li, et al., PeopleTones: A System for the Detection and Notification of Buddy Proximity on Mobile Phones, MobiSys 2008, 14 pages.

Liao, et al., Building Personal Maps from GPS Data, Ann. N.Y. Aca. Sci. 1093: pp. 249-265, 2006.

Lin, et al., Energy-Efficient Boundary Detection for RF-Based Localization Systems, Proceedings of Mobile Computing, 2009, pp. 29-40.

Loopt, retrieved on Jun. 29, 2011 at <<http://www.loopt.com>>, 6 pages.

Mahmoud, et al., Adaptive GPS Duty Cycling, retrieved from <<http://www.cs.ucsb.edu/~hatem/projects/AdaptiveDutyCycling.pdf>> on Jun. 29, 2011, 7 pages.

Marmasse, et al., A User-Centered Location Model, Personal and Ubiquitous Computing (2002) 6:318-321.

Marmasse, et al., Location-Aware Information Delivery with Com-Motion, HUC 2000, pp. 157-171.

Mathias, SmartReminder: A Case Study on Context-Sensitive Applications, Technical Report Jun. 1, 2001, retrieved on Jun. 28, 2011 from <<http://citeseerx.ist.psu.edu/viewdoc/download-?doi=10.1.1.73.1113&rep=rep1&type=pdf>>, 33 pages.

Miluzzo, et al., Sensing Meets Mobile Social Networks: The Design, Implementation and Evaluation of the CenceMe Application, SenSys 2008, pp. 337-350.

Mohan, et al., Nericell: Rich Monitoring of Road and Traffic Conditions using Mobile Smartphones, SenSys 2008, 14 pages.

Murugappan, et al., An Energy Efficient Approach to Processing Spatial Alarms on Mobile Clients, In Proceedings of the ISCA 17th International Conference on Software Engineering and Data Engineering, 2008, 15 pages.

Nham, et al., Predicting Mode of Transport from iPhone Accelerometer Data, retrieved on Jun. 28, 2011 from <<http://www.stanford.edu/class/cs229/proj2008/NhamSiangliulueYeung-PredictingModeOfTransportFromIphoneAccelerometerData.pdf>>, 5 pages.

Nicholson, et al., BreadCrumbs: Forecasting Mobile Connectivity, MobiCom 2008, 12 pages.

Pascoe, The Stick-e Note Architecutre: Extending the Interface Beyond the User, In IUI 1997, pp. 261-264, <<http://citeseerx.ist.psu.edu/viewdoc/download?doi=10.1.1.55.3237&rep=rep1&type=pdf>>.

Placelab.org, retrieved on Jun. 29, 2011 at <<http://www.placelab.org >>, 2 pages.

Ravi, et al., Activity Recognition from Accelerator Data, American Association for Artificial Intelligence (www.aaai.org), 2005, 6 pages.

Sohn, et al., Place-Its: A Study of Location-Based Reminders on Mobile Phones, UbiComp 2005, pp. 232-250.

Thiagarajan, et al., VTrack: Accurate, Energy-Aware Road Traffic Delay Estimation Using Mobile Phones, SenSys 2009, 14 pages.

Top 50 Google Android Applications, retrieved on Jun. 29, 2011 at <<http://www.talkandroid.com/92-developer-challenge-top-50-android-application/>>, 13 pages.

Yamanaka, et al., Localization of Walking or Running User with Wearable 3D Position Sensor, 17th International Conference on Artificial Reality and Telexistence, IEEE 2007, pp. 39-45.

Yoon, et al., Building Realistic Mobility Models from Coarse-Grained Traces, MobiSys 2006, pp. 177-190.

Zheng, et al., GeoLife2.0: A Location-Based Social Networking Service, 2009 Tenth International Conference on Mobile Data Management: Systems, Services and Middleware, IEEE 2009, pp. 357-358.

(56) References Cited

OTHER PUBLICATIONS

Arkasha, et al., "Wigle.net", retrieved on May 23, 2013 at http://wigle.net>>1 page.
Bao et al., "Activity recognition from user-annotated acceleration data", Springer-Verlag Berlin Heidelberg, 2004, 17 pages.
Guha, et al., "AutoWitness: Locating and Tracking Stolen Property While Tolerating GPS and Radio Outages" SenSys, 2010, pp. 29-42.
Jurdak, et al., "Adaptive GPS Duty Cycling and Radio Ranging for Energy-efficient Localization", SenSys, 2010, pp. 57-70.
Kim, et al., "sensloc: sensing everyday places and paths using less energy", SenSys, 2010, pp. 43-56.
Kjaergaard, et al., "Entracked: energy-efficient robust position tracking for mobile devices", MobiSys, 2009, pp. 221-234.
Lester, et al., "A practical approach to recognizing physical activities", Pervasive, 2006, pp. 1-16.
Lin, et al., "Energy accuracy trade off for continuous mobile device location", MobiSys, 2010, pp. 285-298.
Mizell, "Using gravity to estimate accelerometer orientation", Seventh IEEE International Symposium on Wearable Computers, 2003, 2 pages.
Newson, et al., "hidden markov map matching through noise and sparseness", GIS, 2009, 8 Pages.
Paek, et al., "Energy efficient rate adaptive gps based positioning for smartphones", MobiSys, 2010, 16 pages.
Priyantha, et al., "Enabling energy efficient continuous sensing on mobile phones with littlerock", IPSN, 2010, 12 pages.
Reddy, et al., "using mobile phones to determine transportation modes", ACM Trans. Sen. Netw. 6:13:1-13:27, 2010, 03, 27 Pages.
Thiagarajan, et al., "cooperative transit tracking using smartphones", SenSy, 2010, 14 Pages.
Yang, "Toward physical activity diary: motion recognition using simple acceleration features with mobile phones", IMCE, 2009, 9 pages.
Zhuang, et al., "Improving energy efficiency of location sensing on smartphones", MobiSys, 2010, 15 Pages.

\* cited by examiner

LOCATION DETERMINATION

BACKGROUND

Many localization services determine a geographic location of a mobile device by utilizing a global positioning system (GPS), cellular-based localization techniques, and/or wireless access point-based localization techniques. When utilizing GPS, the mobile device receives information from one or more satellites and determines the location based on the received information. When utilizing cellular-based or wireless access point-based techniques, the mobile device receives identification information from one or more communication points (e.g., a cellular base station, Wi-Fi® access point, or Bluetooth® access point), and queries an online service with the identification information to resolve the location.

These approaches suffer from low energy efficiency, long startups delays, low location accuracy, and/or coverage dependency, which adversely affect the localization services and mobile device. For example, GPS suffers from long startup delays, due to a time required to connect with satellites, and consumes a significant amount of energy, which may lead to untimely location information and inefficient use of battery life of the mobile device. GPS also suffers from providing inaccurate location information when the mobile device is in proximity to buildings, commonly referred to as "the canyon effect."

Meanwhile, cellular-based and wireless access point-based localization techniques are coverage dependent and provide low location accuracy, which may lead to unreliable and inaccurate location information. In addition, cellular-based and wireless access point-based localization techniques consume a significant amount of energy to communicate with an online service to resolve the location. These techniques may also provide delayed location information when a network (e.g., cellular network, wireless network, etc.) exhibits poor communication conditions.

There is an increasing opportunity to determine a location of a mobile device in an energy efficient, accurate, and timely manner.

SUMMARY

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

This disclosure is related, in part, to estimating a mobility trace of a device based on a reading obtained from a sensor of the device. The sensor may be, for example, an accelerometer and/or magnetometer sensor. The estimating may include estimating the mobility trace based on a determined motion state of the device. The motion state may be a driving, cycling, walking, or running state, for example, and may be determined through motion state detection.

This disclosure is also related, in part, to mapping a mobility trace to a map. The mapping may include selecting a map based on a determined motion state, and fixing the mobility trace to the selected map based on cell tower data and/or wireless access point data. The cell tower data and/or wireless access point data may be obtained by the device at a location on the mobility trace. The fixing may include utilizing Viterbi decoding based on a Hidden Markov Model to determine a sequence of segments that the device traveled. The sequence of segments may include segments from the selected map.

This disclosure is also related, in part, to determining a location of a device based on a mapped mobility trace. The determining may include performing interpolation or extrapolation to determine the location of the device. The performing interpolation or extrapolation may be based on a plurality of segments of the mapped mobility trace and a speed of the device on at least one of the plurality of segments. Interpolation may be performed when a time included in a location query is determined to be within a time duration of a closed-ended segment. The closed-ended segment may be a segment from the plurality of segments of the mapped mobility trace. Extrapolation may be performed when the time included in the location query is determined to be within a time duration of an open-ended segment. The open-ended segment may be a segment from the plurality of segments of the mapped mobility trace.

BRIEF DESCRIPTION OF THE DRAWINGS

The detailed description refers to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
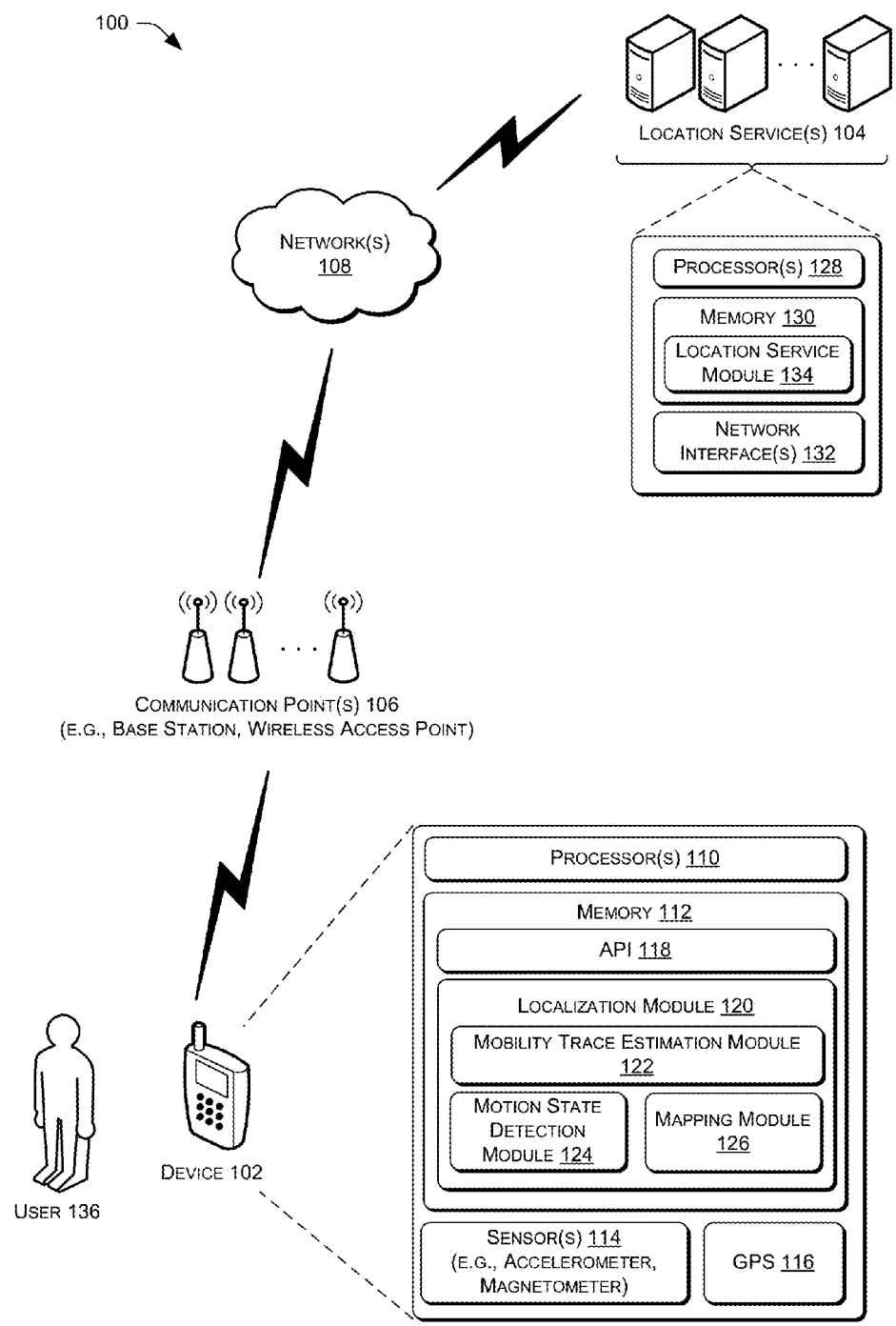
FIG. 1 illustrates an exemplary architecture in which techniques described herein may be implemented.

As discussed above, many localization services determine a location of a mobile device through GPS, cellular-based localization techniques, and/or wireless access point-based localization techniques, which suffer from various disadvantages providing adverse effects to the localization services and mobile device.

This disclosure describes techniques that, among other things, determine a location of a device (e.g., a mobile device) in an energy efficient, location accurate, and timely manner.

Aspects of this disclosure are directed to estimating a mobility trace of a device based on a reading obtained from a sensor of the device. The reading may be obtained from an accelerometer and/or magnetometer sensor of the device and may indicate an acceleration and/or direction of the device. In one example, the reading from the sensor may be obtained without obtaining data from GPS, cellular-based localization techniques, and/or wireless access point-based localization techniques. The estimating may be based on a motion state of the device determined through motion state detection. In one embodiment, the motion state may be a driving, cycling, walking, or running state. In other embodiments, the motion state may include these and/or other motion states (e.g., skipping, strolling, riding a scooter or segway, etc.).

Aspects of this disclosure are also directed to mapping the mobility trace to a map. The mapping may include selecting a map based on a determined motion state, and fixing the mobility trace to the selected map based on cell tower data and/or wireless access point data. The cell tower data and/or wireless access point data may be obtained by the device, at a location on the mobility trace, from a communication point (e.g., a cell tower or wireless access point). Meanwhile, the fixing may include utilizing Viterbi decoding based on a Hidden Markov Model to determine a sequence of segments that the device traveled (e.g., a sequence of road segments).

Aspects of this disclosure are also directed to determining a location of a device based on the mapped mobility trace. The determining may include performing interpolation or extrapolation to determine the location of the device. The performing interpolation or extrapolation may be based on a plurality of segments of the mapped mobility trace and a speed of the device on at least one of the plurality of segments. The interpolation and/or extrapolation may be performed after receiving a location query. The location query may be a query requesting the device to determine the location of the device at a particular time (e.g., a current or past time).

In one example, interpolation is performed when the time included in the location query is determined to be within a time duration of a closed-ended segment. The closed-ended segment may be a segment from the plurality of segments of the mapped mobility trace. The time duration of the closed-ended segment may indicate a traveling duration of the device on the closed-ended segment. Meanwhile, extrapolation may be performed when the time included in the location query is determined to be within a time duration of an open-ended segment. The open-ended segment may be a segment from the plurality of segments of the mapped mobility trace.

The techniques described below may allow a location of a device to be determined in an energy efficient, location accurate, and timely manner. For example, by utilizing readings from energy efficient sensors (e.g., an accelerometer and/or magnetometer), the device may consume less energy than GPS, cellular, or wireless access point based localization techniques. In addition, by utilizing readings from sensors (e.g., accelerometer and/or magnetometer) which are located on the device, the device consumes less energy than localization techniques that require significant amounts of communication power, such as GPS, cellular, and wireless access point based localization techniques. Furthermore, by utilizing sensors located on the device and information which may be previously stored on the device (e.g., a map and cell tower coverage information), the device may determine a location of the device even when a GPS, cellular, or wireless signal becomes weak or non-existent. Moreover, by utilizing cell tower data and/or wireless access point data, which may be utilized periodically, a mobility trace may be accurately mapped to a map in an energy efficient manner.

The sections below are examples provided for the reader's convenience and are not intended to limit the scope of the claims, nor the proceeding sections. Furthermore, the techniques described in detail below may be implemented in a number of ways and in a number of contexts. One example implementation and context is provided with reference to the following figures, as described below in more detail. However, the following implementation and context is but one of many.

Illustrative Architecture

FIG. 1 illustrates an exemplary architecture 100 in which techniques described herein may be implemented. Here, the techniques are described in the context of a device 102 in communication with a location service(s) 104 by means of a communication point(s) 106 and a network(s) 108. For instance, device 102 may communicate with location service(s) 104 to provide and/or receive location information of device 102.

In architecture 100, device 102 may include any combination of hardware and/or software resources configured to process data. Device 102 may be implemented as any number of devices, including, for example, a personal computer, a laptop computer, a cell phone, a tablet device, a personal digital assistant (PDA), etc. Device 102 may be equipped with a processor(s) 110 and memory 112. Device 102 may also be equipped with a sensor(s) 114 and a global positioning system, such as GPS 116. Sensor 114 may include an accelerometer, a magnetometer, and/or another motion-based or magnetic-based sensor.

Memory 112 may include an application programming interface, such as API 118. Memory may be configured to store applications and data. An application, such as localization module 120, running on device 102 performs operations for determining a location of a device. Localization module 120 may include a mobility trace estimation module 122, a motion state detection module 124, and a mapping module 126. Modules 122-126, running on device 102, perform operations for mobility trace estimation, motion state detection, and mapping described herein.

Device 102 may also include other software, hardware, or combinations thereof, to perform GPS, cellular, and/or wireless access point based localization operation(s) to determine a location of device 102. These operation(s) may provide the location in a geo-location form (i.e., longitude and latitude), address form, or any other suitable location format, and may include time and date information. These operation(s) may also include reporting the location of device 102 to a location service, such as location service 104.

Although memory 112 is depicted in FIG. 1 as a single unit, memory 112 may include one or a combination of computer readable media. Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Architecture 100 also includes communication point(s) 106, such as a cell tower(s) (i.e., cell base station), a wireless access point(s), or similar communication point configured to communicate with a device. Communication point(s) 106 may be implemented as appropriate in hardware and include software components. While techniques described herein are illustrated with reference to cell towers and wireless access points, these techniques may additionally or alternatively apply to any other type of communication point enabling communication with a device (e.g., any type of RF-based communication point).

Meanwhile, architecture 100 also includes network(s) 108 and location service(s) 104. Network(s) 108 may include any one or combination of multiple different types of networks, such as cellular networks, wireless networks, local area networks, and the Internet. Location service(s) 104 may include any combination of hardware and software configured to process data. Location service(s) 104 may be implemented on one or more computing devices, for example, a server, a personal computer, or a laptop computer. In one example, location service(s) 104 is hosted on one or more servers in a data center or cloud computing environment.

The one or more computing devices implementing location services(s) 104 may be equipped with a processor(s) 128, memory 130, and a network interface(s) 132. Memory 130 may include one or a combination of computer readable media. Memory 130 may be configured to store applications and data. An application, such as a location service module 134, running on the one or more computing devices, performs operations for a location service.

As an overview, location service(s) 104 may monitor a location of a device(s) and perform operations based on the monitored location. Location service(s) 104 may include, for example, navigation, tracking, tracing, location-based gaming, proximity reminder services, or any other location-based service utilizing location information of a device. During implementation, location service(s) 104 may receive a location(s) of one or more devices, store the location(s), and send location-based information to the one or more devices.

Illustrative Motion State Detection

The following section describes techniques directed to performing motion state detection to determine a motion state of a device.

In one aspect of this disclosure, a device performs motion state detection to determine a motion state of the device. Here, the device may determine that the motion state is a still or moving state. In addition, or alternatively, the motion state may be a subset of the still or moving state, such as a moving state of driving, cycling, walking, or running. The motion state may also be defined based on a location of the device on a user, such as a location of device 102 on user 136. For example, the location may be an upper body (u), hip pocket (h), or pant pocket (p) location.

In one implementation, the device determines the motion state of the device based on features extracted from a magnitude of acceleration. The magnitude of acceleration may be obtained from an accelerometer of the device. Here, the device may determine the motion state by utilizing a decision tree (DT) with thresholds previously defined. Some of the extracted features may include, for example, standard deviation of magnitude, spectrum shape index, sprout frequency, trough imbalance degree, and sprout and trough asymmetry to be described in further detail below.

The standard deviation of magnitude may be utilized to classify a motion state of the device, for example, into one of three states, such as S1: {absolute still}, S2: {quasi-still, driving, cycling(u, h)}, and S3: {walking(u, h, p), cycling (p)}. Here, the device may utilize two thresholds $\sigma_1$ and $\sigma_2$. $\sigma_1$ may be set to a conservative small value to allow a high confidence when determining a state as absolute still. $\sigma_2$ may be set to a larger value to allow a high confidence when determining a state such as those in S3. In one example, state S1 is determined when the standard deviation of magnitude is less than $\sigma_1$, state S2 is determined when the standard deviation of magnitude is greater than $\sigma_1$ and less than $\sigma_2$, and state S3 is determined when the standard deviation of magnitude is greater than $\sigma_2$. In one implementation, $\sigma_1$ and $\sigma_2$ are set to 0.2 and 2.0, respectively.

The spectrum shape index may be utilized to further classify the motion state of S2, for example, into one of two states, such as S21: {cycling(u, h)} and S22: {driving, quasi-still}. The spectrum shape index may be defined as a ratio of maximal FFT coefficient value to an average value. The spectrum shape index may be utilized to separate a signal with more periodicity from a signal with less periodicity. In one example, in a signal with more periodicity, an energy distribution is more concentrated as compared to a signal with less periodicity. The FFT may be applied on a horizontal component of the acceleration.

The sprout frequency may be utilized to further classify the state of "quasi-still" in S22, for example, into one of two states, such as casual-still and driving-waiting. Casual-still may refer to a state where the device is still with infrequent casual motion, such as sitting or standing still. Driving-waiting may refer to a state where the device is driving and not moving, such as when the device is stopped at a traffic light.

The sprout frequency may be defined as a number of sprouts in a detection window. The sprout frequency is a temporal domain feature which may be calculated by counting the occurrences of sprouts. In one implementation, an acceleration signal is first mean removed. Thereafter, a magnitude of acceleration that exceeds a sprout threshold, such as $\delta_{sp}$, may be marked as a sprout candidate. Consecutive sprout candidates may then be merged and counted as one sprout. A threshold $\sigma_3$ may then be utilized to differentiate casual-still from driving. For example, when a number of sprouts, or merged sprouts, in a detection window does not exceed the threshold $\sigma_3$, the device may be determined to be in a casual-still state. Alternatively, when the number of sprouts, or merged sprouts, in the detection window exceeds threshold $\sigma_3$, the device may be determined to be in a driving state. This approach may consider an observation that causal movement of a device may cause only occasional sprouts, while typical road conditions may cause frequent sprouts.

Thereafter, a threshold $\sigma_4$ may be utilized to determine whether the classified driving state is a driving-moving or driving-waiting state. For example, when a magnitude of a sprout, or a merged sprout, is greater than $\sigma_4$, the device may be determined to be in a driving-moving state. Alternatively, when the magnitude of the sprout, or merged sprout, is less than $\sigma_4$, the device may be determined to be in a driving-waiting state. Threshold $\sigma_4$ may consider an observation that in a driving-waiting state, the vehicle engine may be the only vibration source, which may be significantly attenuated.

Figure 2A:
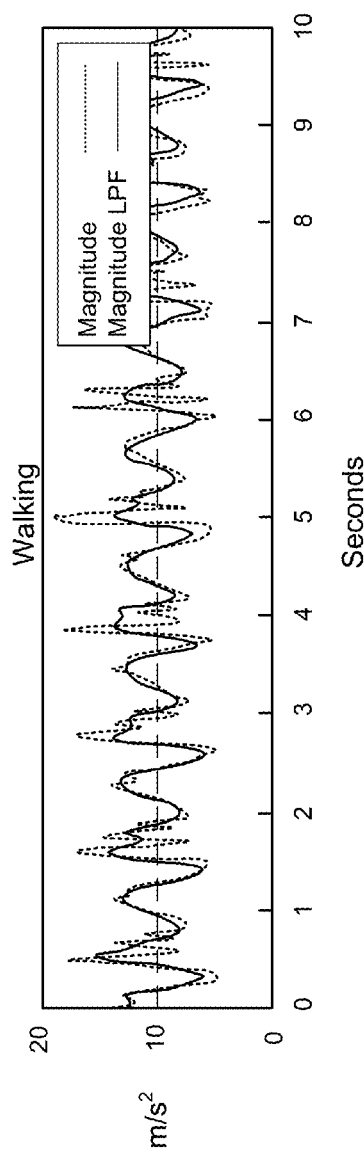
FIGS. 2A-2B illustrate exemplary plots of magnitudes of acceleration with respect to time.
Figure 2B:
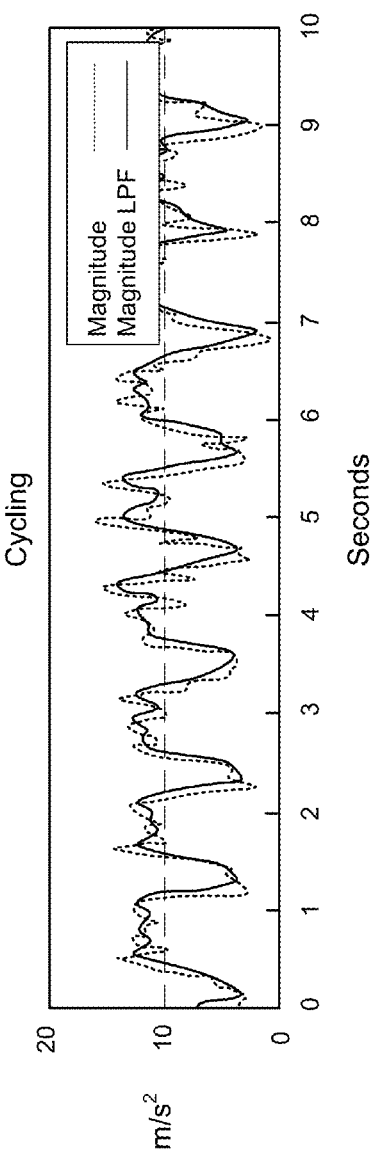

Meanwhile, in one example, the magnitude of acceleration is utilized to further classify the motion states of S3, which may account for changes in an orientation of the device. FIGS. 2A-2B illustrate differences between magnitudes of acceleration for walking and cycling and will be described in further detail hereafter.

In one implementation, the trough imbalance degree is utilized to further classify motion state S3, for example, into one of two states, such as S31: {walking (h, p)} and S32: {walking(u), cycling(p)}. The trough imbalance may be defined as a ratio between two neighboring trough depths. Meanwhile, a trough depth may be defined as a difference between an average and a minimum magnitude of acceleration in a trough, and a trough may be defined as an area under an average magnitude of acceleration line. In one example, when the trough imbalance degree is smaller than one, the reciprocal is taken.

FIGS. 2A-2B illustrate exemplary plots of magnitudes of acceleration with respect to time. In FIGS. 2A-2B, the y-axis represents a magnitude of acceleration in $m/s^2$ and the x-axis represents time in seconds. The magnitudes of acceleration are shown as raw magnitudes (e.g., dotted line), obtained from an accelerometer, and filtered magnitudes (e.g., solid line), obtained from filtering the raw magnitudes with a low pass filter (LPF). FIG. 2A illustrates a magnitude of acceleration in a motion state of walking with a device located in a pocket of a user. FIG. 2B illustrates a magnitude of acceleration in a motion state of cycling with a device located in a pocket of a user. In FIGS. 2A-2B, the horizontal dotted lines indicate the magnitude of gravity, which serves as the reference in determining a trough imbalance degree.

In one example, when the trough imbalance degree is greater than a threshold, the device may determine that the motion state is S31, and when the trough imbalance degree is not greater than the threshold, the device may determine that the motion state is S32. Here, the trough imbalance degree may indicate a location of the device. For example, when the device is located in a pant or hip pocket, the trough imbalance may be greater than when the device is located in another location. When the device is located in another location the trough imbalance may be close to one.

Figure 3B:
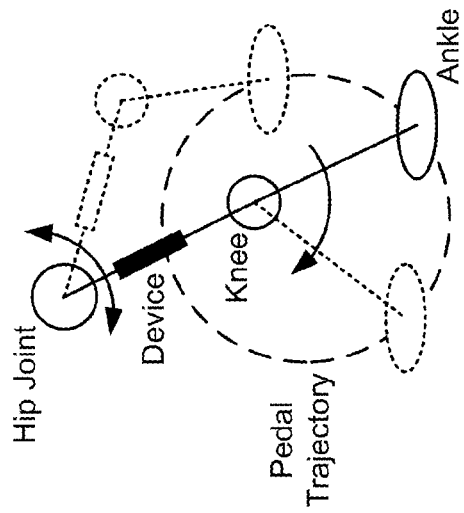
FIGS. 3A-3B illustrate exemplary causes of trough imbalance and sprout and trough asymmetry.
Figure 3A:
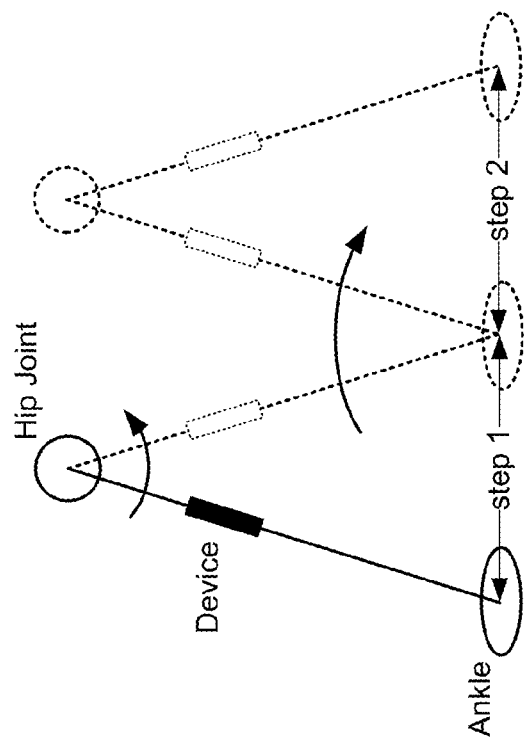

FIGS. 3A-3B illustrate exemplary causes of trough imbalance and sprout and trough asymmetry. FIG. 3A illustrates a motion of a device and user as the user is walking or running, and FIG. 3B illustrates a motion of a device and user as the user is cycling on a bicycle. As illustrated in FIG. 3A, in step 1, an orientation of the device is changing around the hip joint, while in step 2, the orientation is changing around the ankle.

Meanwhile, the device may utilize the sprout and trough asymmetry to classify the motion state S32 into walking(u) or cycling(p). The sprout and trough asymmetry may be defined as a ratio between a trough depth and a sprout height. In one implementation, when the sprout and trough asymmetry is greater than a threshold, the device may determine that the motion state is the cycling(p) state, and when the sprout and trough asymmetry is not greater than the threshold, the device may determine that that motion state is the walking(u) state.

As illustrated in FIG. 3B, for cycling(p), the device has large magnitude of acceleration changes when the thigh moves around the hip, and small magnitude of acceleration changes when the lower leg moves around the knee (i.e., in the lower half of a pedaling circle). Accordingly, the magnitude of acceleration may be asymmetric during cycling.

In one implementation, the device may sample an accelerometer of the device at 25 Hz, and all samples may be preprocessed by taking an average over four nearby samples. In this implementation, state detection may be performed every second over a four-second running detection window. After a rough classification is obtained utilizing the classifier and a decision tree, a second pass may be applied to remove misclassifications. In the second pass, the device may consider 1) the motion state's continuity (e.g., high unlikelihood of entering a still state during a fast driving state), 2) the motion state's transition possibility (e.g., high unlikelihood of changing to a cycling state immediately after a driving state), and 3) penalty of an incorrect detection (e.g., higher penalty for detecting a still state as a driving state than for detecting a driving state as a still state). In one implementation, when there are sporadic different states among a sequence of detected states, those sporadic different states are corrected in view of the first consideration, such that a sporadic different state is changed to the same state as a detected state immediately before or after the sporadic different state. Meanwhile, if those different states are not sporadic, but continuous for a short period, then the different states are determined to be incorrect detected states if the transition possibility between the two states is low. Here, the incorrect detected states may be removed in view of the second consideration.

Although this section describes various motion state detection techniques, in some embodiments conventional motion state techniques may also be utilized to determine a motion state of a device. These techniques may generally include obtaining one or more readings from a motion sensor of the device, such as an accelerometer and/or magnetometer, and determining the motion state based on the one or more readings.

Meanwhile, the device may perform motion state detection until a condition is satisfied. For example, the device may perform motion state detection until a moving state is determined. When the moving state is determined the device may estimate a mobility trace of the device utilizing the techniques described hereafter.

Alternatively, or in addition, the device may periodically obtain sensor readings from a sensor of the device (e.g., an accelerometer and/or magnetometer) based on a first period of time. Here, the device may also perform motion state detection and/or estimate a mobility trace of the device periodically based on a second period of time, where the second period of time is longer than the first period of time.

Illustrative Mobility Trace Estimation

The following section describes techniques directed to estimating a mobility trace of a device. The mobility trace may be estimated after it is determined that the motion state of the device is a moving state.

Figure 4:
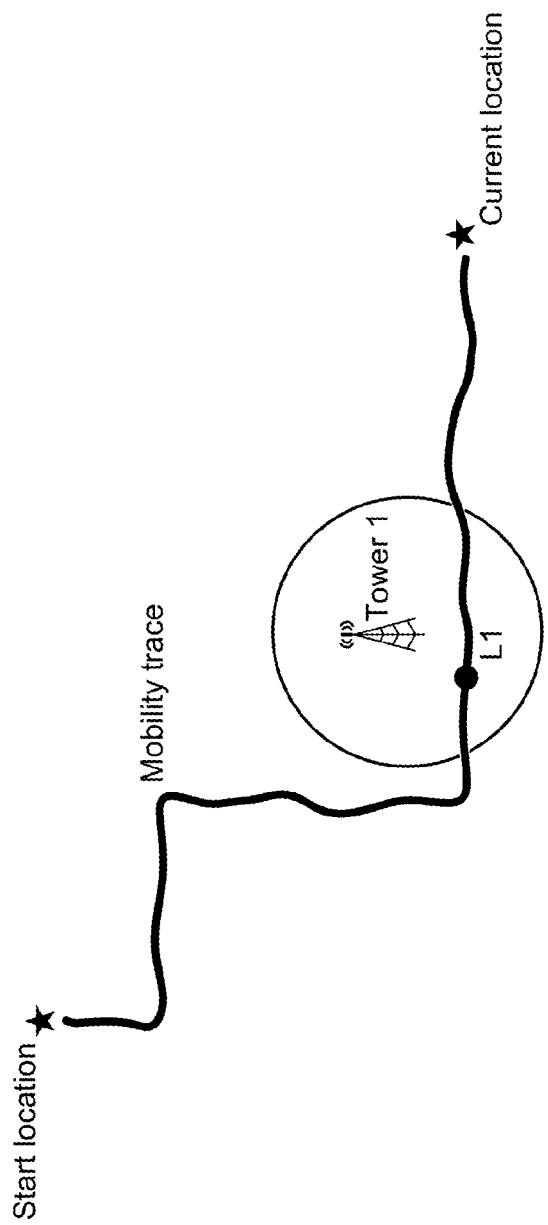
FIG. 4 illustrates an exemplary mobility trace of a device.

FIG. 4 illustrates an exemplary mobility trace of a device. As illustrated, the mobility trace identifies a traveled path of the device from a start location to a current location of the device. The mobility trace may include a plurality of segments and turns, where the turns are between the plurality of segments. Each of the plurality of segments may be associated with a speed of the device on the segment. For example, a particular segment may be associated with a particular speed (e.g., 60 mph) indicating that the device traveled the particular speed at a point on the particular segment. Each of the plurality of segments may also have a distance and a direction. The distance may correspond to a traveled distance of the device in the corresponding direction. FIG. 4 also illustrates a location L1 and a cell tower (i.e., Tower 1) to be described in further detail hereafter.

In one aspect of this disclosure, the mobility trace is estimated based on one or more readings obtained from a sensor of the device, such as an accelerometer and/or magnetometer. The one or more readings may generally indicate an acceleration of the device and/or a direction the device is traveling.

Meanwhile, a determined motion state of a device may determine the techniques utilized to estimate a mobility trace. For example, when the device is determined to be in a driving state the device may estimate the mobility trace through driving techniques, and when the device is determined to be in a cycling state, the device may estimate the mobility trace through cycling techniques.

(A) Illustrative Mobility Trace Estimation in a Driving State

Aspects of this disclosure are directed to estimating a mobility trace based on a heading vector and/or orientation vector. The heading vector may be based on one or more readings from an accelerometer of the device, and the orientation vector may be based on one or more readings from a magnetometer of the device. The heading vector and/or orientation vector may be utilized when the device is determined to be in a driving motion state.

In one implementation, a mobility trace of a device is estimated in a 3-D Global Cartesian coordinate system (G) with acceleration readings obtained from a 3-D Cartesian coordinate system (M). This approach may allow a device to estimate a mobility trace of the device with respect to a vehicle where the device is located. Here, the device is in the coordinate system M, whereas the vehicle is in the coordinate system G. Meanwhile, an acceleration reading obtained from a sensor of the device (e.g., an accelerometer) is also in the coordinate system M, because the sensor is located on the device. Accordingly, in order to obtain a mobility trace in G from acceleration readings in M in this implementation, the mobility trace is estimated by utilizing a heading vector.

The heading vector may refer to an actual acceleration of the vehicle that occurs in G. For example, as the vehicle is traveling along a road segment the vehicle may experience an acceleration which may be represented as the heading vector along the road segment.

Thereafter, the heading vector may be utilized to estimate a speed, distance, and direction associated with the mobility trace. For example, the device may estimate the speed of the device at a location on the mobility trace through integration of an acceleration along the heading vector, and may estimate the distance of a segment of the mobility trace through double integration of the acceleration along the heading vector. Meanwhile, the direction of the device at a location on the mobility trace may be estimated based on an angle between the heading vector and an orientation vector to be described hereafter.

In one example, the heading vector is obtained as $\vec{h}=\vec{a}'-\vec{a}$, where $\vec{h}$ represents the heading vector and $\vec{a}'$ and $\vec{a}$ represent two acceleration readings. These two accelerations may be two readings obtained from an accelerometer of the device, where there is no orientation change of the device between the two readings. In one example, the two readings may be obtained when the device is positioned in any orientation, as long as the orientation remains constant between obtaining the two readings. Detection of the orientation of the device will be discussed hereafter.

In one implementation, processing is performed on an acceleration reading before it is utilized to estimate a heading vector. For example, a two step process may be performed on the acceleration reading, which may be a noisy raw signal. In a first step, the device may apply median filtering to accelerometer readings sampled at 25 Hz, which may remove accidental spikes in the accelerometer readings. The filtered accelerometer readings may be utilized in obtaining the heading vector. In a second step, the device may calculate a mean acceleration from acceleration readings obtained over a two-second running window, and utilize the mean acceleration for obtaining the heading vector. In one example, the two-second running window represents a window set based on empirical data from experimental driving experiences.

Meanwhile, the device may obtain a heading vector at a time when a strong acceleration or deceleration is determined. For example, the device may determine the strong acceleration or deceleration when one or more acceleration readings are greater than a threshold, and obtain the heading vector in response to the determination. The device may alternatively, or in addition, determine a strong acceleration or deceleration based on average acceleration readings. For example, the device may utilize average acceleration readings in a previous period (e.g., a previous 60 seconds) as rough gravity and obtain a rough horizontal plane based on the rough gravity. The average acceleration readings may exclude portions of large variance in magnitude of acceleration. Thereafter, the device may project an acceleration reading onto the rough horizontal plane and identify a strong acceleration or deceleration as a large acceleration change on the rough horizontal plane. These techniques may allow the device to obtain a reliable heading vector.

The device may also obtain a more reliable heading vector based on a bi-direction search of an extended window around strong acceleration or deceleration points. Here, the device may extend the window to a longer period than the window was previously set, and perform a bi-direction search to identify the most stable acceleration reading(s) within the extended window. The average acceleration within the extended window is then obtained. This operation may be applied both before and after the strong acceleration or deceleration. The heading vector may then be obtained from the resulting more stable acceleration readings.

In one implementation, the heading vector includes one or more properties that may be useful to calibrate the heading vector. For example, the heading vector may always be orthogonal to a gravity in M for an arbitrary motion in a horizontal plane, as long as there is no orientation change between two accelerometer readings. This property may indicate that if a device is moving horizontally, then the heading vector may always be orthogonal to the gravity (also expressed in M). Here, when the device identifies chances of reliable gravity estimation, the device may fine tune a possible imperfect heading vector so as to remove the impact of gravity on the heading vector.

In another property, the heading vector may always be orthogonal to a centripetal acceleration in M when turning on a horizontal plane, as long as there is no orientation change between two accelerometer readings. This property may indicate that when a device is moving along a straight road segment (which may be identified via stable magnetometer readings), the centripetal component may be around zero, and when the device is moving along a road segment having a turn, there may be a transient surge in the centripetal acceleration, with positive and negative surges corresponding to right and left turns, respectively.

Aspects of this disclosure are also directed to estimating a distance and speed of a device based on a heading vector. Here, given a heading vector $\vec{h}$ and for any acceleration $\vec{a}$, the device may calculate the acceleration component along the heading vector $\vec{a}_h$ as:

$$\vec{a}_h = <\vec{a}, \vec{h}_{norm}> \cdot \vec{h}_{norm}$$

where $\vec{h}_{norm}$ is the normalization of $\vec{h}$. Here, $\vec{a}_h$ contributes to a movement of a vehicle along a road. With $\vec{a}_h$, the speed and distance of the device may be estimated through integration and double integration of $\vec{a}_h$, respectively.

In one example, the device may utilize acceleration error mitigation techniques to address any exaggerated inaccurate acceleration readings. This may allow the device to account for double integration which may exaggerate the effect of an inaccurate acceleration reading, such as drift or initial error, especially when integrating over a long time interval.

In one implementation, the acceleration error mitigation techniques may include utilizing mean removal which may remove mean acceleration noise from all accelerometer readings of an entire integration interval. This approach considers that when a device starts from a still state, a speed obtained via integration of acceleration may be zero when the device comes to a next still state. In other words, any non-zero final speed must be caused by noises in acceleration.

Alternatively, or in addition, the acceleration error mitigation techniques may include utilizing the following process. First, when the device observes strong acceleration changes, the device may repeatedly obtain a heading vector. This may be performed even when an orientation change of the device is detected. Second, when long stable motion segments (e.g., still state of a device at a traffic light or constant speed at cruising) are identified, the device may utilize average accelerometer readings as gravity (still in M) and re-calibrate a previous heading vector through orthogonality. This may prevent gradual or slight orientation changes during movement of the device, especially after turning.

Third, the device may utilize a weighted moving average to account for a heading vector that may vary slightly around a real heading vector that the device desires to find. Here, the weighted moving average may balance an impact of previous heading vectors and a current detection. The weighted moving average may be defined by:

$$\vec{h}_t' = w \cdot \vec{h}_t + (1-w) \cdot \vec{h}_{t-1}'$$

where $\vec{h}_t'$ is a determined heading vector, $\vec{h}_t$ is a newly detected heading vector, and w is a weight. Fourth, when a calculated velocity is negative while the vehicle is still in a driving state, the device may slightly adjust the heading vector such that the calculated velocity is positive. Similarly, the device may adjust the heading vector when a velocity above a threshold is detected (e.g., a high calculated velocity).

Meanwhile, the device may also estimate a direction of travel of the device. The device may estimate the direction based on an angle between the heading vector and an orientation vector ($\vec{d}$) obtained from a magnetometer of the device. For example, the device may calculate the angle in two steps: 1) project $\vec{d}$ to a horizontal plane and obtain a horizontal component $\vec{d}_h$ from:

$$\vec{d}_h = \vec{d} - <\vec{d}, \vec{a}_{v,norm}> \cdot \vec{a}_{v,norm}$$

where $\vec{a}_{v,norm}$ is a normalized vertical acceleration of $\vec{a}_v$ obtained via $\vec{a}_v = \vec{a} - \vec{a}_h$; and 2) calculate the angle $\theta$ from:

$$\theta = \arccos(\vec{d}_h \cdot \vec{h} / |\vec{d}_h| \cdot |\vec{h}|).$$

This angle $\theta$ may correspond to the direction of travel of the device at a location on the mobility trace. Here, the orientation vector $\vec{d}$ may be filtered through a median filtering to remove transient large orientation changes.

This two step approach for calculating the angle may account for an alignment of a coordinate system with respect to the magnetometer and a coordinate system with respect to the accelerometer (i.e., M). For example, because the magnetometer and accelerometer are fixed to the same device, the Cartesian coordinate system with respect to the magnetometer and the Cartesian coordinate system with respect to the accelerometer may have a fixed geometry mapping (e.g., through a Euler transform matrix $W_{mag}$). The $W_{mag}$ may be obtained via a calibration process, which may only need to be performed once. In one example, the two coordinate systems are aligned, i.e., $W_{mag} = I$.

With an estimated direction, the device may determine a strong accelerometry change to be an acceleration or deceleration. In one example, the device may determine the strong accelerometry change when the change is greater than a threshold. In this example, the device may assume motion continuity of a vehicle where the device is located, i.e., the vehicle does not make abrupt 180-degree turns. The motion continuity may indicate a continuity of direction of the device and vehicle. Here, the device may determine an acceleration when the angle $\theta$ is small (i.e., close to or at zero degrees), and the device may determine a deceleration when the angle $\theta$ is large (i.e., close to or at 180 degrees).

Meanwhile, the device may detect a turn of the device based on one or more estimated directions of travel of the device. In one example, the device compares changes in the one or more directions against a threshold $\Theta$. Here, with an instantaneous direction of travel $\theta$, the device may first obtain a stationary direction at time t as a mean of $\theta$s observed since a last direction change at $t_0$, i.e., $\vec{\theta}_t = (\Sigma_{t_0}^{t} \theta)/(t-t_0)$. Thereafter, the device may compute the direction change at t as $\Delta\theta_t = \theta_{t+1} - \vec{\theta}_t$. If $|\Delta\theta_t| \geq \Theta$, then the starting point of a turning phase is spotted at t. In one implementation, threshold $\Theta$ is set to 25 degrees. Here, an end point of a turn is detected when an instantaneous direction becomes stable again (i.e., minimal direction changes compared to a threshold), which is evaluated over a four-second running window at $t_1$. The overall turning angle may be a difference between the stationary directions at $t_1$ and t. A final check may be performed to ensure a real turn. Here, the device may determine the real turn when an angle difference is larger than the threshold $\Theta$ and the time difference between $t_1$ and t is more than four seconds.

Aspects of this disclosure are also directed to detecting an orientation change of a device. In one example, the orientation change is detected when a significant change of a vertical acceleration of the device is detected and a significant change of a direction of the device is detected. Here, the device may monitor a vertical acceleration component (i.e., $\vec{a}_v$), and detect the significant change in the vertical acceleration when the vertical acceleration component is greater than a threshold. This threshold may be set to 0.1 g, which corresponds to a 25-degree inclination. Meanwhile, the device may monitor an angle $\theta$ between a heading vector and a magnetometer's north direction, and detect the significant change of direction of the device when the change of direction occurs within a predetermined time duration (e.g., within one second). This may allow the device to distinguish an orientation change from a turn, which may also be associated with a change of direction.

The device may also filter out suspicious orientation changes by utilizing a mark and trace back approach. A suspicious orientation change may refer to a possible incorrect orientation change which is not caused by a vehicle. In one implementation, every orientation change is initially treated as a suspicious orientation change until a new heading vector is detected. Here, the device may mark a time and put the device into an undetermined state when a suspicious orientation change is detected. Thereafter, the device may re-estimate a heading vector when a strong acceleration change is detected, and trace back to the moment of a last suspicious orientation change. If multiple suspicious orientation changes exist, then the device may discard the suspicious changes. The device may assume that a motion state (both speed and heading direction) between the first and the last suspicious orientation change is a mean over a previous and subsequent steady motion state.

The detected orientation change may be utilized in various techniques of this disclosure. For example, as discussed above, the device may obtain a heading vector based on two acceleration readings where there is no orientation change of the device between the two readings. In this example, the device may determine whether there is an orientation change between two readings, by comparing times associated with the two readings and the detected orientation change. When a time of the detected orientation change is between a time of the first reading and a time of the second reading, the device may determine an orientation change between the two readings. When the orientation change is detected between two readings, the heading vector may be re-estimated from acceleration changes which are subsequent to the orientation change.

(B) Illustrative Mobility Trace Estimation in a Cycling, Walking, or Running State Aspects of this disclosure are directed to estimating a mobility trace of a device based on a pedaling frequency, number of steps, and/or magnetometer reading corresponding to a minimum magnitude of acceleration. The pedaling frequency, number of steps, and/or magnetometer reading may be utilized when the device is determined to be in a cycling, walking, or running motion state.

In one example, when the device is determined to be in the cycling motion state, the device may estimate a speed and distance associated with the mobility trace based on a periodicity of cycling. Here, the speed of the device at a location on the mobility trace may be estimated as a linear function of a pedaling frequency. For example, the speed may be proportional to the pedaling frequency. In one implementation, the device estimates that the speed to be a first speed when the pedaling frequency is a first frequency, and estimates the speed to be a second speed when the pedaling frequency is a second frequency, where the first speed is less than the second speed and the first frequency is less than the second frequency. The pedaling frequency may be determined while the device is obtaining readings from an accelerometer during motion state detection.

Figure 5:
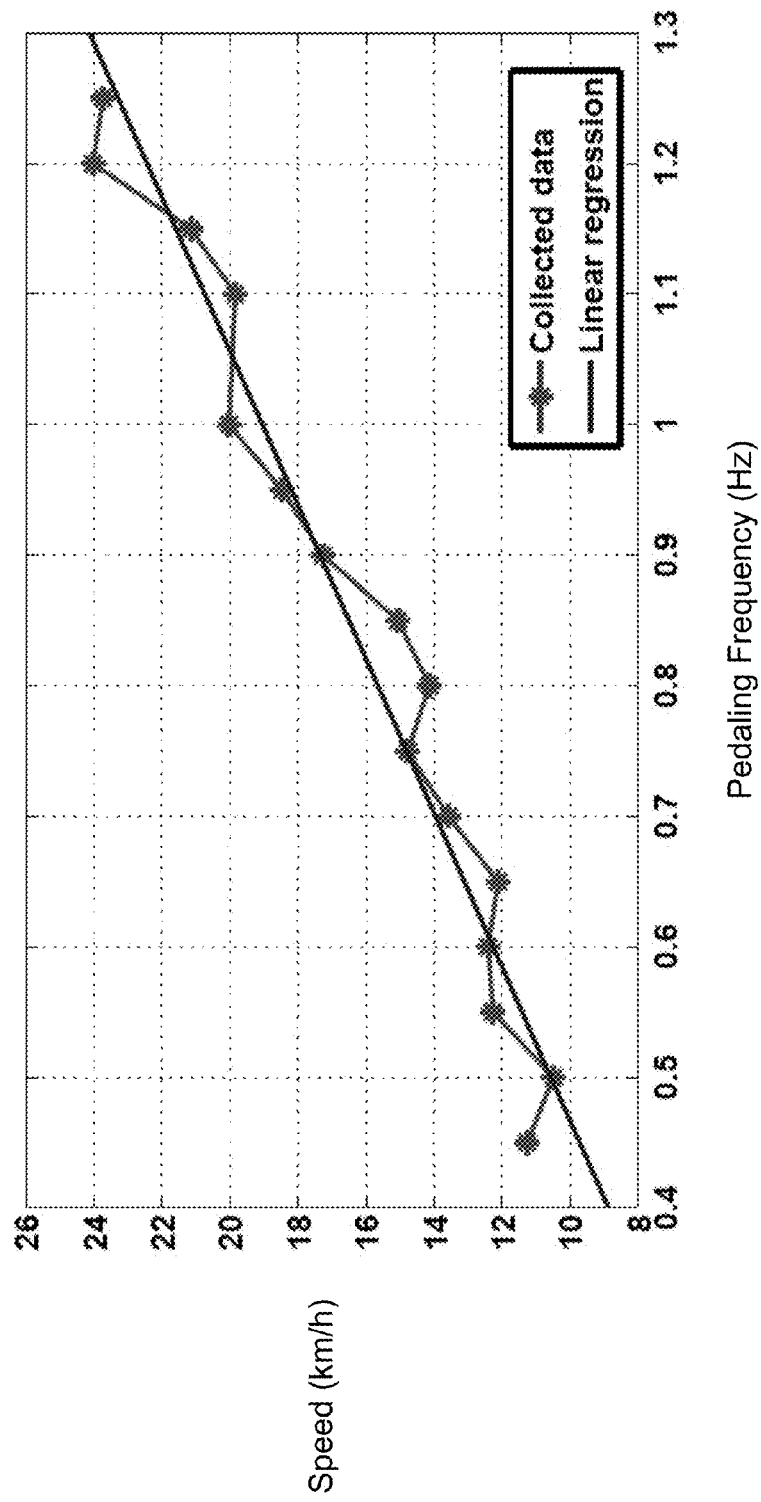
FIG. 5 illustrates an exemplary graph of a linear correlation between a speed of a device and a pedaling frequency of a user.

FIG. 5 illustrates an exemplary graph of a linear correlation between a speed of a device and a pedaling frequency of a user. In FIG. 5, the y-axis represents the speed of the device in km/h, and the x-axis represents the pedaling frequency of the user in Hz. The slope of the linear function may depend on a bicycle type and a user riding the bicycle. The slope may be determined after the device performs mapping by selecting a road segment and dividing the segment by a number of pedaling cycles. In one implementation, the slope is set to 17 km/h/Hz. The device may also estimate a coasting speed of the device by averaging a speed immediately before the coast and a speed immediately after the coast. The device may determine that the device is in a coast based on the pedaling frequency of the user.

Meanwhile, the device may estimate the distance based on the speed and a duration of time associated with the speed. The duration of time may indicate a time duration during which the device was traveling at the speed. Here, the device may estimate the distance as corresponding to the speed multiplied to the duration of time.

Meanwhile, when the device is determined to be in a walking or running motion state, the device may estimate a speed and distance of the device based on a periodicity of walking or running. For example, the device may calculate a number of steps a user with the device has traveled, and estimate the speed and distance based on this number. A step of the user may be determined with the readings from the accelerometer of the device. Here, the distance may be estimated by multiplying the number of steps to an average stride length, which may be previously set and/or stored in the device. The speed may be estimated as the distance over a traveling time of the device for the distance.

The device may also estimate a direction of the device based on readings from an accelerometer and magnetometer of the device. In one example, the estimated direction of the device corresponds to a direction obtained from a magnetometer when the magnitude of acceleration reaches a minimum value. Here, the estimated direction of the device may correspond to a median of directions obtained from the magnetometer when the magnitude of acceleration reaches minimum values. The obtained readings may be obtained in a previous number of cycles (e.g., in a last three cycles), where a cycle is determined by a readings from the accelerometer and/or magnetometer.

Meanwhile, a minimum value of the magnitude of acceleration may be determined by sampling a plurality of readings from the accelerometer, each indicating a magnitude of acceleration, and identifying a reading from the plurality of readings which has a lowest magnitude of acceleration. In one implementation, the device may utilize these techniques to estimate the direction of the device when the device is located anywhere on a user, including, for example, an upper body, hip pocket, and pant pocket location. The techniques for estimating the direction of the device may be applied, among other cases, in a case where the device is in a cycling, walking, or running motion state.

Figure 6:
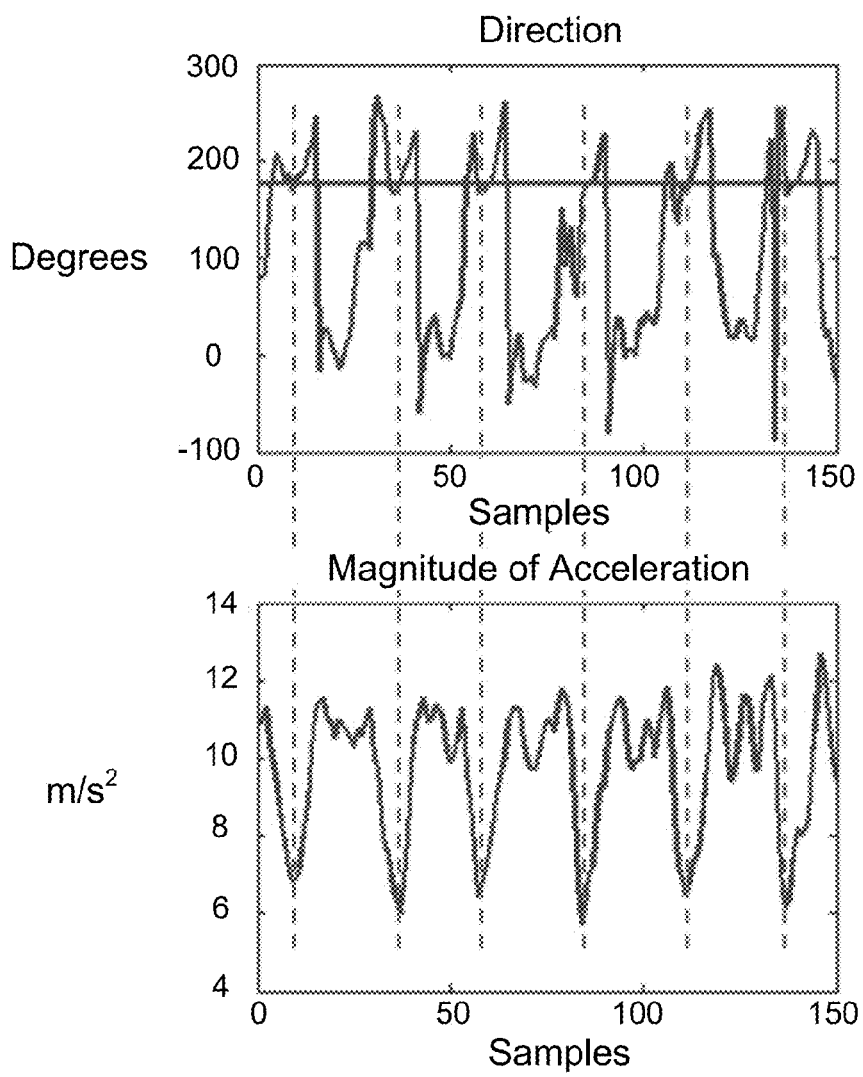
FIG. 6 illustrates an exemplary correlation between a direction and a magnitude of acceleration.

FIG. 6 illustrates an exemplary correlation between a direction and a magnitude of acceleration. The top graph illustrates a direction of travel of the device determined by sampling a magnetometer, and the bottom graph illustrates a magnitude of acceleration of the device determined by sampling an accelerometer. Here, the dotted vertical lines identify samples where the magnitude of acceleration is a minimum. The horizontal solid line in the top graph indicates the actual direction of the device which may be obtained based on a median of directions corresponding to minimum magnitudes of acceleration.

Illustrative Mobility Trace Mapping

The following section describes techniques directed to mapping an estimated mobility trace of a device to a map. The estimated mobility trace of the device may be obtained from one or more of the techniques described above. The mapping may include selecting the map based on a determined motion state of the device. For example, when the device is determined to be in a driving motion state, the device may select a map corresponding to driving, such as a road map. The mapping may also include fixing the estimated mobility trace to the selected map. The fixing may be based on cell tower data and/or wireless access point data obtained by the device at a location on the mobility trace.

Cell tower data may refer to identification information of one or more cells or cell towers of a cellular network. Cell tower data may include a CellID, cell tower ID, or similar identification information. Meanwhile, wireless access point data may include identification information identifying one or more wireless access points (e.g., a Wi-fi® or Bluetooth® access point). The cell tower data and/or wireless access point data may be obtained by a device and indicate that the device is within a coverage area of the cell tower or wireless access point identified in the cell tower data or wireless access point data.

Meanwhile, a map may be previously stored on the device or obtained as the device travels. The map may be obtained from a database including a plurality of maps. The map may be any type of map identifying a road, segment, path, location, and/or other information generally understood as being included on a map.

As discussed above, FIG. 4 illustrates an exemplary mobility trace and cell tower (e.g., Tower 1) associated with a location L1. Here, the device obtains cell tower data from the cell tower when the device is at location L1 on the mobility trace. The cell tower data identifies the cell tower and indicates that the device is within a coverage area of the cell tower, as illustrated by the circle surrounding the cell tower.

Meanwhile, a mobility trace may be mapped to a selected map by utilizing a Hidden Markov Model (HMM) and applying Viterbi decoding. For example, the mapping may include fixing the estimated mobility trace to the selected map by utilizing Viterbi decoding based on the HMM. Here, the HMM may include hidden states and the Viterbi decoding may determine a sequence of the hidden states which corresponds to a sequence of segments that the device traveled. The sequence of segments may include segments of a selected map (e.g., road segments for a selected road map). The HMM may include parameters, such as hidden states, observations, emission probabilities, and/or transition probabilities, to be described in detail below.

A hidden state of the HMM may refer to a span of one or more road segments. The span of one or more road segments may be defined as one or more continuous road segments between one intersection and another intersection. Here, if a road has N intersections with other roads, then there may be N possible hidden states, which may be dependent on where a starting point of the mobility trace is.

An observation may include, for example, an angle of a turn(s), a distance between two consecutive turns, and/or cell tower data and/or wireless access point data. The cell tower data and/or wireless access point data may be obtained at one or more locations on a mobility trace. The cell tower data and/or wireless access point data may identify a rough location of the device. The rough location may be obtained from a cell tower or wireless access point database including location information for cell towers and/or wireless access points.

An observation may also include, for example, location data obtained through GPS, cellular-based localization techniques, and/or wireless access point-based localization techniques. This location data may be sporadically obtained as the device travels on a mobility trace, which may allow the device to conserve energy.

In one embodiment, cell tower data and/or wireless access point data is utilized as an observation instead of location data obtained through GPS, cellular-based localization techniques, and/or wireless access point-based localization techniques. This may allow the device to device to conserve energy.

Meanwhile, an emission probability may describe a probability of an observation given a specific hidden state. In one example, a joint probability density is utilized as an emission probability. The joint probability density may be defined as $\Pi N(dist(l_t, c_t))$, where $N(\cdot)$ is a zero mean Gaussian function (due to a noisy cell tower location) with variance R (a rough estimation of an average radius of the cell tower coverage), $l_t$ is a uniformly interpolated position at sampling time t along the specific hidden state, $c_t$ is a location of the cell tower observed at t, and $dist(l_t, c_t)$ is an Euclidian distance between $l_t$ and $c_t$. R may be a system parameter. This approach may consider that a cell tower ID, and the associated location information, may provide a rough estimation of a position of the device when the cell tower ID was sampled. In addition, this approach may consider that there may be multiple cell tower ID samplings along a span of one or more road segments (due to a mobility of the device), because a cellular module of the device may update on a predetermined period (e.g., every second).

A transition may refer to a transition between hidden states, and be signaled when a turn is detected. Meanwhile, a transition probability may be calculated from all observations at the turn. In one example, several constraints are imposed to limit a number of candidate hidden states, including, for example, bound-limiting on estimated angles of turns, error distribution of estimated distances, and cell tower coverage. At an $n^{th}$ turn and hidden state j, which was transitioned from state i at $(n-1)^{th}$ turn, the transition probability to a new state k may be computed as:

$$P(j|d) = \frac{P(d|j)P(j)}{\sum P(j)P(d|j)}.$$

The priori probability P(j) may be calculated as follows:

$$P(j) = 1/N$$

where N is a total number of candidate states. At a start state (e.g., t=1), the candidates include all intersections lying within the coverage of the cell tower observed at the turn except those with no outgoing states that lie within the direction range $(\gamma \pm \epsilon_\gamma)$. If t>1, the candidate states may be identified with the following three conditions: 1) egresses from state i, i.e., whose first segment joins the last segment of state i; 2) the angle of turn is within the direction range $\gamma \pm \epsilon_\gamma$; and 3) the end point is within the coverage of the cell tower observed at the turn.

Meanwhile, the conditional probability P(d|j) may be calculated as follows:

$$P(d|j) = \frac{1}{\sigma_j \sqrt{2\pi}} e^{\frac{-(d-d_j)^2}{2\sigma_j^2}}$$

where P(d|j) is the conditional probability of an estimated distance d at the candidate state j, $d_j$ is the actual length of the state j, and $\sigma_j$ reflects the variance of the distance estimation algorithm when the actual length is around $d_j$, assuming the distance estimation error follows a Gaussian distribution.

In one implementation, if multiple cell tower readings are available (e.g., when a device can hear multiple cell towers), the scope of candidate states may be further narrowed for the calculation of both the emission and transition probabilities. Alternatively, or in addition, when the cell tower location is not available, no cell tower constraint may be applied.

As noted above, a HMM may utilize cell tower data and/or wireless access point data obtained at one or more locations on a mobility trace. This data may be utilized to identify an area of a map to search. For example, when a device obtains cell tower data and/or wireless access point data identifying a cell tower and/or wireless access point, this indicates that the device is located within a coverage area of the cell tower and/or wireless access point. This data may provide a rough location of the device which may be utilized to identify an area of a map to search in order to map a mobility trace to the map.

Figure 7:
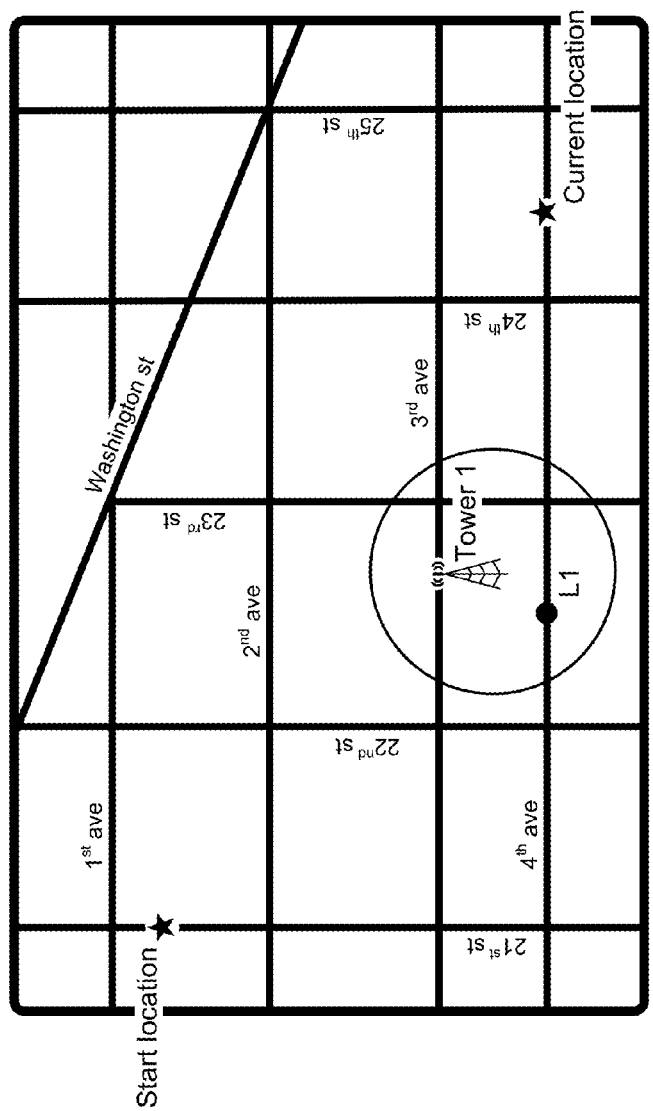
FIG. 7 illustrates an exemplary map and cell tower coverage area which may be utilized in mapping a mobility trace to the map.

FIG. 7 illustrates an exemplary map and cell tower coverage area which may be utilized in mapping a mobility trace to the map. Here, when the device is at location L1, the device is within the cell coverage area of Tower 1, as illustrated by L1 being located within the circle surrounding Tower 1. In this example, the mobility trace from FIG. 4 is mapped to the map by searching the area of the map corresponding to the coverage area of Tower 1. Although in this example the map is searched based on a circular coverage area of the cell tower, the map may also be searched based on other shapes or areas which are smaller or larger in area than the coverage area of the cell tower.

Meanwhile, the Viterbi algorithm may determine the most likely sequence of hidden states corresponding to the mobility trace. The resulting sequence of hidden states may represent the fix of the mobility trace to segments of the map. Here, the fixed mobility trace may include a sequence of segments which may represent the actual segments of the map that the device traveled. In one example, the sequence of segments is a sequence of road segments.

Figure 8:
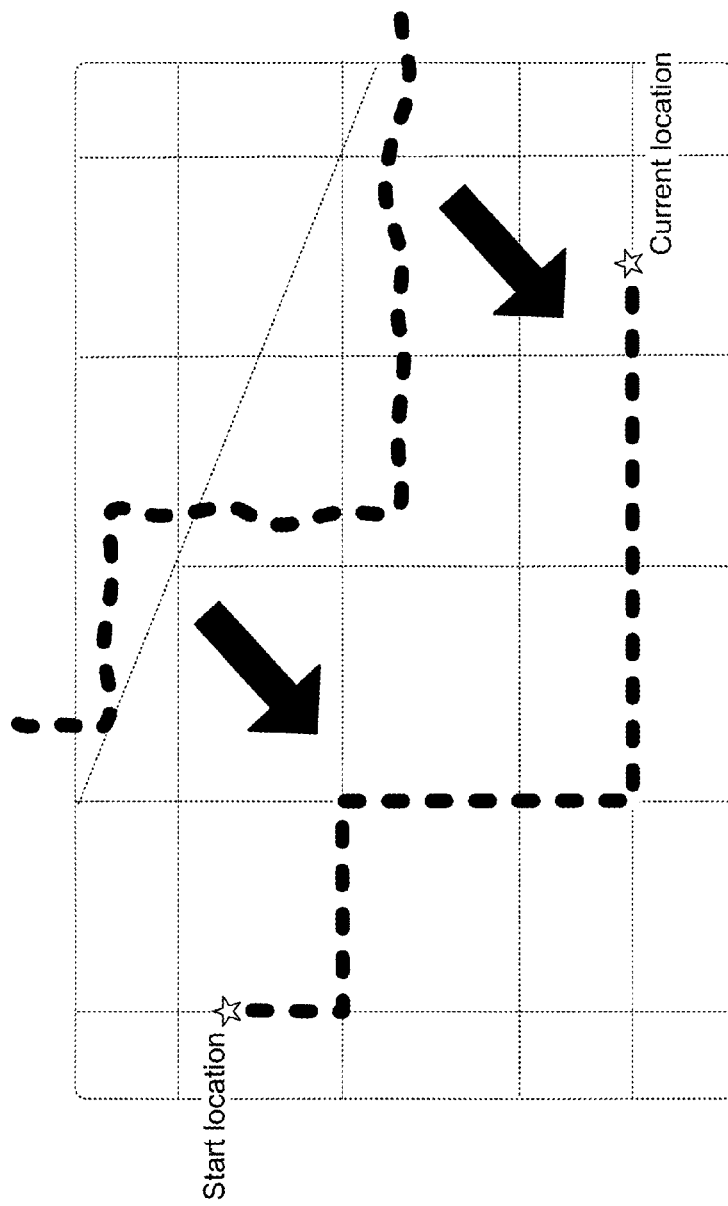
FIG. 8 illustrates an exemplary mobility trace fixed to a map.
Figure 9:
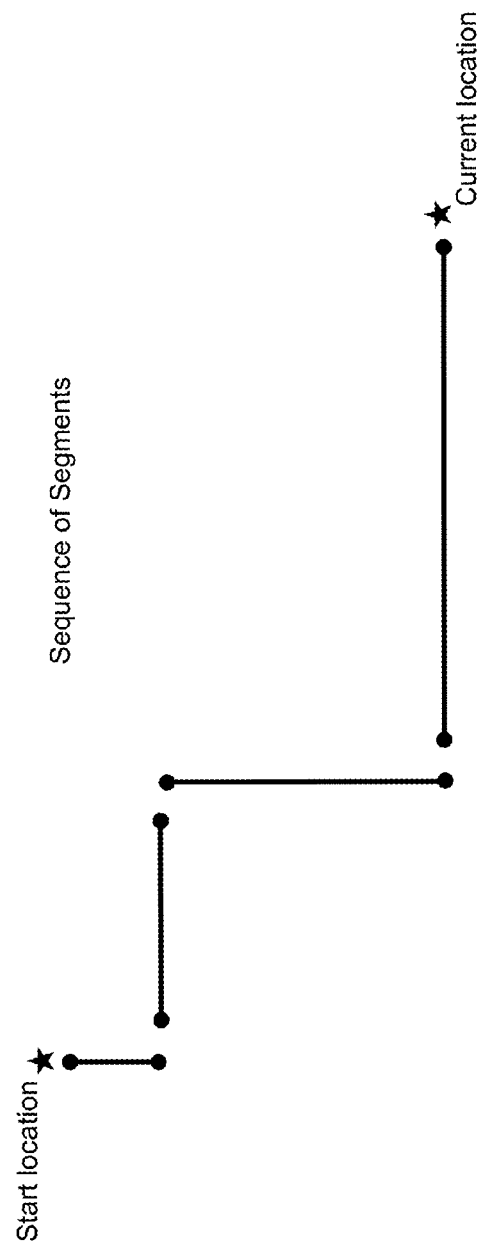
FIG. 9 illustrates an exemplary sequence of segments of the fixed mobility trace of FIG. 8.

FIG. 8 illustrates an exemplary mobility trace fixed to a map. Here, the mobility trace is fixed to the actual segments of the map that the device traveled. FIG. 9 illustrates an exemplary sequence of segments of the fixed mobility trace of FIG. 8. Here, each segment is illustrated as a straight line with a dot at each end of the line. Although represented in FIG. 9 as straight lines, the segments of the fixed mobility trace may be in any form or shape, and may be generally based on a form or shape of the segments of the map (e.g., road segments).

Illustrative Location Determination

The following section describes techniques directed to determining a location of a device at a given time based on a mapped (e.g., fixed) mobility trace. As discussed above, the mapped mobility trace may include a sequence of segments (e.g., road segments) of a map that the device traveled. A segment may be defined by one or more turns located at ends of the segment. Here, the device may determine the location by utilizing interpolation or extrapolation based on the sequence of segments and a speed of the device.

In one implementation, the sequence of segments (e.g., road segments) are ordered based on times that the device traveled the segments. For example, a first segment may be ordered before a second segment where the device traveled the first segment before the second segment. In the sequence of segments, a first and last segment of the sequence may be opened-ended, and the other segments closed-ended. An opened-ended segment may be a segment with one or more undetermined ends (e.g., turns), and a closed-ended segment may be a segment with two determined ends (e.g., two consecutive turns).

Meanwhile, a location of a device may determined in response to a location query. The location query may be sent from a location-based service or application and may request the device to determine the location of the device at a particular time (e.g., a current or past time). In one example, when the particular time included in the location query is determined to be within a time duration during which the device traveled a closed-ended segment, the location is determined by performing interpolation. The interpolation may be implemented by the following equation:

$$L(t) = L(t_0) + \frac{\sum_{i=t_0}^{t} v[i]}{\sum_{i=t_0}^{t_1} v[i]} \cdot \text{dist}(t_0, t_1)$$

where L(t) is a location of a device at a particular time t, $L(t_0)$ is a start location of a road segment at time $t_0$, v[i] is an instantaneous speed of the device on the road segment, $t_1$ is a time when the device passed the road segment, and dist($t_0,t_1$) is a distance of the road segment corresponding to the interval [$t_0,t_1$] and is obtained from a map. Here, $\Sigma_{i=t_0}^{t_1} v[i]$ may not be equal to dist($t_0,t_1$) due to distance estimation error.

Meanwhile, when the particular time included in the location query is determined to be within a time duration during which the device traveled an open-ended segment, the location is determined by performing extrapolation. Extrapolation may be utilized when the location query requests a current location of the device at a current time. The extrapolation be implemented by the following equation:

$$L(t) = L(t_0) + \sum_{i=t_0}^{t} v[i] \cdot \Delta T$$

where L(t) is a location of a device at a particular time t, $L(t_0)$ is a start location of a road segment at time $t_0$, v[i] is an instantaneous speed of the device on the road segment, and $\Delta T$ is a sensor sampling interval.

In one example, the device may perform Viterbi decoding in the background of the device (i.e., without notice to a user of the device) until a location query is received. Here, the device may continuously fix the mobility trace of the device to segments of the map, and then determine a location of the device in response to receiving the location query. When the location query is received, the device may also determine all intermediary locations through time-and-speed-based interpolation. The intermediary locations may correspond to locations of the mobility trace between a time when a previous location query was received and a time when a current location query was received.

Furthermore, after the device determines the location of the device, the device may provide the determined location to a service or application, such as a location-based service or application. The service or application may be a service or application running on the device or running remotely. In addition, the device may provide an estimated or mapped mobility trace of the device to the service or application. The determined location and mobility trace may be provided to the service or application via a set of service APIs.

Illustrative Process

Figure 10:
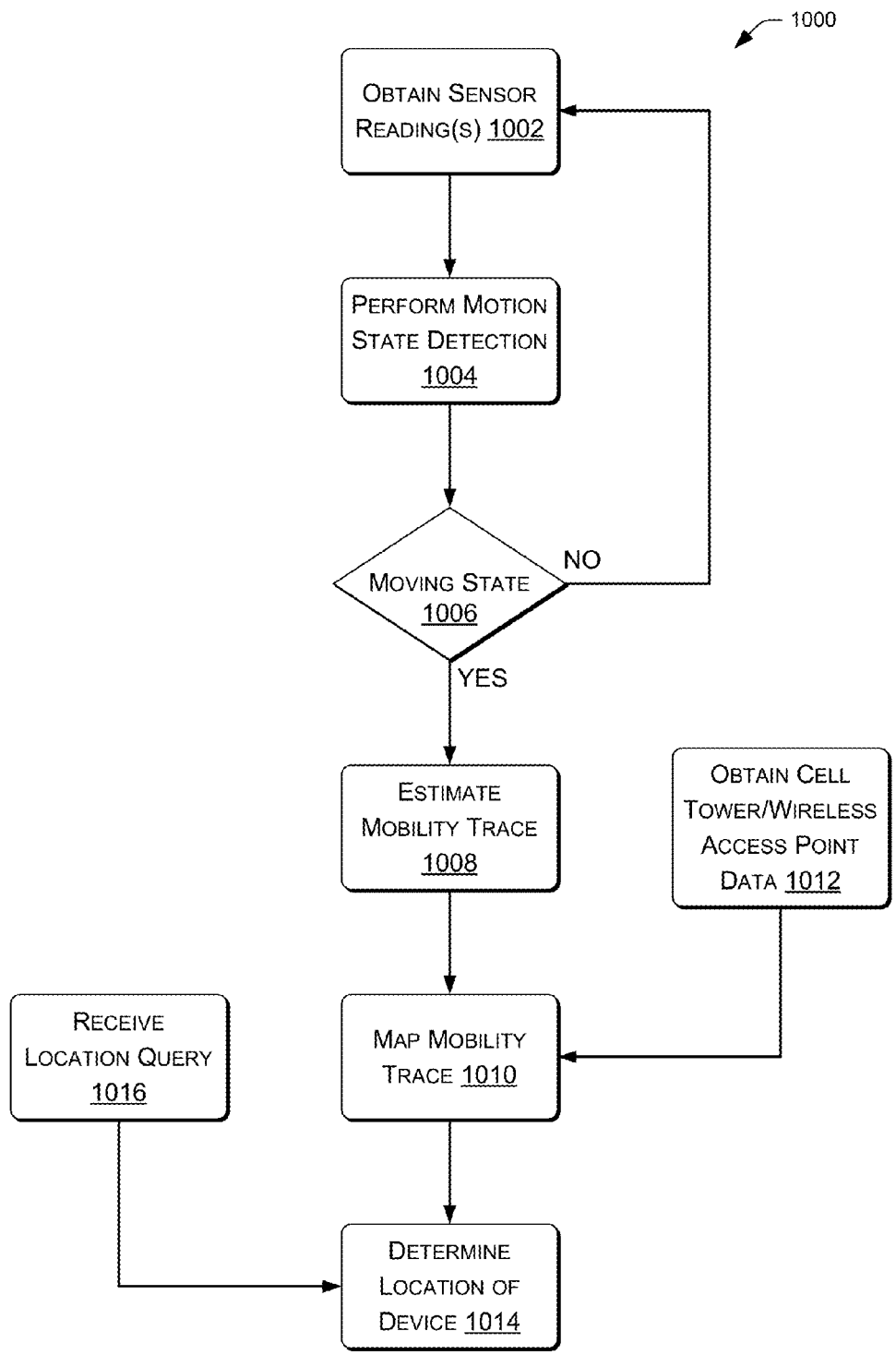
FIG. 10 illustrates an exemplary process of location determination.

The following section describes, in reference to FIG. 10, an exemplary process of location determination. Process 1000 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

For ease of illustration, process 1000 is described as being performed in the environment 100 of FIG. 1. For example, process 1000 may be performed by localization module 120 of device 102. However, process 1000 may be performed in other environments. Moreover, the environment of FIG. 1 may be used to perform other processes.

Process 1000 includes an operation 1002 for obtaining a sensor reading(s) from a sensor a device, such as sensor(s) 114 of device 102. The sensor reading(s) may include a reading from an accelerometer and/or magnetometer of the device. The device may obtain the sensor reading(s) periodically based on a predetermined period of time.

Thereafter, process 1000 may proceed to an operation 1004 for performing motion state detection to determine a motion state of the device. The motion state may be based on the sensor reading(s) obtained in operation 1002. Operation 1004 may be performed by motion state detection module 124 of device 102, and may include many of the techniques discussed above in the section entitled "Illustrative Motion State Detection."

Process 1000 may also include an operation 1006 for determining whether a determined motion state is a moving state. When the determined motion state from operation 1004 is not a moving state (e.g., a still state), the process 1000 may return to operation 1002. Alternatively, when the determined motion state is the moving state, the process 1000 may proceed to an operation 1008.

Operation 1008 may include estimating a mobility trace of a device based on previously obtained sensor readings(s), such as the sensor reading(s) obtained in operation 1002. The mobility trace may include a plurality of segments and turns. The estimating may be performed periodically based on a predetermined period of time. The predetermined period of time may be a longer period of time than the predetermined period of time for obtaining sensor reading(s). Moreover, the mobility trace may be estimated based on techniques that are specific to the motion state determined in operation 1004. Operation 1008 may be performed by mobility trace estimation module 122 of device 102, and may include many of the techniques discussed above in the section entitled "Illustrative Mobility Trace Estimation."

Process 1000 may also include an operation 1010 for mapping a mobility trace of a device to a map. The mapping may include selecting a map and fixing the mobility trace to the selected map. The selecting may be based on a determined motion state, such as the motion state determined in operation 1004. The fixing may be based on cell tower data and/or wireless access point data, which may be obtained from an operation 1012. Moreover, the mapping may be performed in response to detecting a turn of the device on the mobility trace. Operation 1010 may be performed by mapping module 126 of device 102, and may include many of the techniques discussed above in the section entitled "Illustrative Mobility Trace Mapping."

Operation 1012 may include obtaining cell tower data and/or wireless access point data as the device travels on the mobility trace. The cell tower data and/or wireless access point data may indicate that the device was located within a coverage area of a communication point(s) identified in the cell tower data and/or wireless access point data.

Process 1000 may also include an operation 1014 for determining a location of a device based on a mapped mobility trace. The location of the device may determined in response to receiving a location query, for example, in an operation 1016. The mapped mobility trace may be the mapped mobility trace from operation 1010, and may include a plurality of segments. Operation 1014 may include performing interpolation or extrapolation based on the plurality of segments and a speed of the device on one of the plurality of segments.

Operation 1016 may include receiving a location query including a time of a requested location of the device. The location query may be received from a location-based service or application. The location query may request that the device determine a location of the device at the time included in the location query.

Illustrative Implementation

The following section describes an exemplary implementation for many of the techniques discussed above. In this implementation, these techniques are implemented as a service or application which is continuously running in the background of a device (e.g., a mobile device). In one example, the service or application performs motion state detection, distance estimation, and turn detection periodically based on a first period of time (e.g., four seconds) to maintain a small memory footprint. Meanwhile, the service or application may perform mapping in response to detecting a turn. The device may perform the mapping even if a location query has not been received. This approach may allow the service or application to provide a location of the device in a timely manner.

In one example, the service or application runs in the background in a wake-lock mode by calling a WakeLock API with a parameter PARTIAL_WAKE_LOCK. In this mode, the service or application may remain running in the background after a user presses a power button to put the device into a sleep mode. An AlarmManager API may also be used to wake a CPU of the device from the sleep mode.

In a further implementation, the service or application may utilize a determined still motion state of the device to place the system into a sleep mode. For example, when the device is determined to be in an absolute still motion state (e.g., a still motion state for more than five minutes), the sampling process may begin duty cycling to sample a sensor reading only four seconds per minute. In this case, the service or application may set the device to a sleep mode between samplings by utilizing an AlarmManager API to put the CPU of the device into the sleep mode.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

The invention claimed is:

1. A method implemented by a device, comprising:
obtaining, periodically according to a first period of time, a reading from at least one of an accelerometer or a magnetometer sensor of the device;
estimating, by the device, a mobility trace of the device based at least in part on the reading, the estimating occurring according to a second period of time that is longer than the first period of time, the mobility trace including a plurality of segments, at least one of the plurality of segments being a closed-ended segment, and at least one of the plurality of segments being an open-ended segment;
selecting a map from a plurality of maps based at least in part on a type of transportation associated with the device, each map of the plurality of maps being associated with a different type of transportation route than other maps of the plurality of maps;
mapping, by the device, the mobility trace to the selected map; and
determining, by the device, a geographic location of the device based at least in part on the mapped mobility trace, the determining including performing at least one of interpolation or extrapolation, the interpolation being based at least in part on the closed-ended segment, and the extrapolation being based at least in part on the open-ended segment.

2. The method of claim 1, wherein the mobility trace further includes a plurality of turns, the turns being between the plurality of segments, each of the plurality of segments being associated with a speed of the device and having a distance and a direction, the distance corresponding to a traveled distance of the device in a corresponding direction.

3. The method of claim 2, wherein the estimating includes:
estimating at least one of speeds based on integration of an acceleration, the acceleration being based on the reading;
estimating at least one of distances based on double integration of the acceleration; and
estimating at least one of directions based on an angle between a heading vector and an orientation vector, the heading vector being obtained from a difference between two accelerometer readings, and the orientation vector being obtained from a magnetometer reading.

4. The method of claim 2, wherein the estimating includes:
estimating at least one of speeds based on a pedaling frequency, the pedaling frequency being based on the reading;
estimating at least one of distances based on the at least one of the speeds and a duration of time associated with the at least one of the speeds; and
estimating at least one of directions based on a magnetometer reading, the magnetometer reading corresponding to a minimum magnitude of acceleration, the minimum magnitude of acceleration being a minimum magnitude among a plurality of magnitudes of acceleration.

5. The method of claim 2, wherein the estimating includes:
estimating at least one of distances based on a number of steps a user of the device has traveled and an average stride length of the user for each of the steps;
estimating at least one of speeds based on the at least one of the distances and a traveling time of the device for the at least one of the distances; and
estimating at least one of the directions based on a magnetometer reading, the magnetometer reading corresponding to a minimum magnitude of acceleration, the minimum magnitude of acceleration being a minimum magnitude among a plurality of magnitudes of acceleration.

6. The method of claim 1, further comprising:
performing motion state detection to determine a motion state of the device based on the reading, the motion state comprising a state in which the device is moving or a state in which the device is still,
wherein the estimating includes estimating the mobility trace based on the determined motion state.

7. The method of claim 1, further comprising:
obtaining wireless access point data that identifies at least one wireless access point, the wireless access point data being obtained by the device at a location on the mobility trace,
wherein the mapping includes fixing the mobility trace to the selected map based on the wireless access point data.

8. The method of claim 1, further comprising:
obtaining cell tower data that identifies at least one cell tower, the cell tower data being obtained by the device at a location on the mobility trace,
wherein the mapping includes fixing the mobility trace to the selected map based on the cell tower data.

9. The method of claim 8, wherein
the mobility trace further includes a plurality of turns;
the map includes a plurality of road segments and turns; and
the mapping includes fixing the plurality of segments and turns of the mobility trace to the plurality of road segments and turns of the map.

10. The method of claim 8, wherein the fixing includes utilizing Viterbi decoding based on a Hidden Markov Model to determine a sequence of segments that the device traveled, the sequence of segments including segments from the selected map.

11. The method of claim 10, wherein the Hidden Markov Model includes at least one of a hidden state, an observation, an emission probability, and/or a transition probability, the hidden state being a span of road segments of the map, the observation including an angle of a turn within the mobility trace, a distance between two turns within the mobility trace, or the cell tower data.

12. The method of claim 10, wherein the Hidden Markov Model includes hidden states and the Viterbi decoding determines a sequence of the hidden states, the sequence of the hidden states corresponding to the sequence of segments that the device traveled.

13. The method of claim 1, wherein:
the performing at least one of interpolation or extrapolation includes performing at least one of interpolation or extrapolation to determine the geographic location of the device based at least in part on the mapped mobility trace and a speed of the device on at least one of the plurality of segments.

14. The method of claim 13, further comprising:
receiving a location query from a location-based service or application, the location query including a time of a requested location of the device,
wherein the speed is a speed of the device on the closed-ended segment, and the determining includes:

determining that the time of the requested location is within a time duration of the closed-ended segment, the time duration indicating a traveling duration of the device on the closed-ended segment; and performing the interpolation in response to determining that the time is within the time duration of the closed-ended segment, the interpolation being performed based on the speed and the time of the requested location.

15. The method of claim 13, further comprising:

receiving a location query from a location-based service or application, the location query including a time of a requested location of the device, wherein the speed is a speed of the device on the open-ended segment, and the determining includes:

determining that the time of the requested location is within a time duration of the open-ended segment, the time duration indicating a traveling duration of the device on the open-ended segment; and performing the extrapolation in response to determining that the time is within the time duration of the open-ended segment, the interpolation being performed based on the speed and the time of the requested location.

16. The method of claim 1, further comprising:

detecting a turn based on the reading, wherein the mapping includes mapping the mobility trace in response to detecting the turn.

17. A device comprising:

one or more processors; and one or more computer storage media storing computer-executable instructions executable by the one or more processors that, when executed by the one or more processors, cause the one or more processors to perform acts comprising:

obtaining, periodically according to a first period of time, a reading from at least one of an accelerometer or a magnetometer of the device;

determining a motion state of the device based at least in part on a location of the device on a user;

estimating a mobility trace of the device based at least in part on the determined motion state and the reading, the mobility trace including a plurality of segments, at least one of the plurality of segments being a closed-ended segment, and at least one of the plurality of segments being an open-ended segment;

mapping the mobility trace to the map based at least in part on cell tower data identifying a cell tower the device communicated with along the mobility trace, the mobility trace being mapped by searching an area of the map that corresponds to a coverage area of the cell tower and fixing a portion of the mobility trace to a portion of the map that is within the area; and performing at least one of interpolation or extrapolation to determine the location of the device based at least in part on the mapped mobility trace, the interpolation being based at least in part on the closed-ended segment, and the extrapolation being based at least in part on the open-ended segment.

18. One or more computer storage media storing computer-executable instructions executable by one or more processors that, when executed by the one or more processors, cause the one or more processors to perform acts comprising:

obtaining, periodically according to a first period of time, a reading from at least one of an accelerometer or a magnetometer sensor of a device;

estimating a mobility trace of the device based at least in part on the reading, the estimating occurring according to a second period of time that is longer than the first period of time, the mobility trace including a plurality of segments, at least one of the plurality of segments being a closed-ended segment, and at least one of the plurality of segments being an open-ended segment;

selecting a map from a plurality of maps based at least in part on a type of transportation associated with the device, each map of the plurality of maps being associated with a different type of transportation route than other maps of the plurality of maps;

mapping the mobility trace to the selected map; and determining a geographic location of the device based at least in part on the mapped mobility trace, the determining including performing at least one of interpolation or extrapolation, the interpolation being based at least in part on the closed-ended segment, and the extrapolation being based at least in part on the open-ended segment.

19. The one or more computer storage media of claim 18, wherein the mobility trace further includes a plurality of turns, the turns being between the plurality of segments, each of the plurality of segments being associated with a speed of the device and having a distance and a direction, the distance corresponding to a traveled distance of the device in a corresponding direction.

20. The one or more computer storage media of claim 18, wherein the acts further comprise:

obtaining cell tower data that identifies at least one cell tower, the cell tower data being obtained by the device at a location on the mobility trace, wherein the mapping includes fixing the mobility trace to the selected map based at least in part on the cell tower data.

* * * * *